United States Patent
Kook et al.

(10) Patent No.: US 9,945,452 B2
(45) Date of Patent: Apr. 17, 2018

(54) PLANETARY GEAR TRAIN OF AUTOMATIC TRANSMISSION FOR VEHICLES

(71) Applicant: Hyundai Motor Company, Seoul (KR)

(72) Inventors: Jae Chang Kook, Gyeonggi-do (KR); Hyun Sik Kwon, Seoul (KR); Wonmin Cho, Gyeonggi-do (KR); Seong Wook Hwang, Gyeonggi-do (KR); Seongwook Ji, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 38 days.

(21) Appl. No.: 15/258,888

(22) Filed: Sep. 7, 2016

(65) Prior Publication Data

US 2017/0268616 A1  Sep. 21, 2017

(30) Foreign Application Priority Data

Mar. 16, 2016 (KR) .................. 10-2016-0031678

(51) Int. Cl.
*F16H 3/66* (2006.01)

(52) U.S. Cl.
CPC ....... *F16H 3/66* (2013.01); *F16H 2200/0073* (2013.01); *F16H 2200/2012* (2013.01); *F16H 2200/2048* (2013.01); *F16H 2200/2097* (2013.01)

(58) Field of Classification Search
CPC ..... F16H 2200/2097; F16H 2200/2048; F16H 2200/2012; F16H 2200/2046
See application file for complete search history.

(56) References Cited

U.S. PATENT DOCUMENTS

| 8,932,175 B2 | 1/2015 | Phillips et al. | |
| 9,441,710 B2 * | 9/2016 | Beck ........................ | F16H 3/666 |

FOREIGN PATENT DOCUMENTS

| FR | 2897136 A1 * | 8/2007 | ............. F16H 3/663 |
| JP | 2009-197927 A | 9/2009 | |
| JP | 2012189221 A * | 10/2012 | ............... F16H 3/66 |
| JP | 2013-072464 A | 4/2013 | |
| KR | 10-1459477 B1 | 11/2014 | |
| WO | WO-2017044019 A1 * | 3/2017 | ............... F16H 3/66 |

* cited by examiner

*Primary Examiner* — Sherry L Estremsky
(74) *Attorney, Agent, or Firm* — Mintz Levin Cohn Ferris Glovsky and Popeo, P.C.; Peter F. Corless

(57) ABSTRACT

A planetary gear train of an automatic transmission for a vehicle is provided. The planetary gear train includes an input shaft receiving power of an engine and an output shaft outputting the power. Additionally, four planetary gear sets are provided. Various shafts the connect the elements of the gear sets either selectively or directly. The planetary gear set maximizes driving efficiency of the engine and improves power delivery performance and fuel consumption through the achievement of the more shift-stages of the automatic transmission.

8 Claims, 2 Drawing Sheets

FIG. 2

| SHIFT-STAGE | CONTORL ELEMENT |||||||  GEAR RATIO |
|---|---|---|---|---|---|---|---|---|
| | C1 | C2 | C3 | C4 | C5 | C6 | B1 | |
| D1 | | | ● | ● | | | ● | 5.440 |
| D2 | | | ● | | | ● | ● | 3.348 |
| D3 | | | ● | ● | | ● | | 2.057 |
| D4 | | ● | ● | | | ● | | 1.654 |
| D5 | | | ● | | ● | ● | | 1.478 |
| D6 | ● | | ● | | | ● | | 1.243 |
| D7 | ● | ● | ● | | | | | 1.000 |
| D8 | ● | ● | | | | ● | | 0.890 |
| D9 | ● | ● | | | | | ● | 0.762 |
| D10 | ● | | | ● | | | ● | 0.668 |
| D11 | ● | | | | | ● | ● | 0.621 |
| REV | | ● | ● | | | | ● | -3.600 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0031678 filed in the Korean Intellectual Property Office on Mar. 16, 2016, the entire contents of which are incorporated herein by reference.

BACKGROUND (a) Field of the Invention

The present invention relates to an automatic transmission for a vehicle, and more particularly, to a planetary gear train of an automatic transmission for a vehicle capable of obtaining a power delivery performance improving effect and fuel consumption improving effect by implementing at least advance 11-speed shift-stages using minimal number of components and capable of decreasing driving noise using a driving point in a low revolution per minute (RPM) region of an engine.

(b) Description of the Related Art

In general, in an automatic transmission field, research has been conducted for achieving more shift-stages to maximize enhancement of fuel consumption and drivability of a vehicle, and recently, the increase of oil price is triggering a competition in enhancing fuel consumption of a vehicle. In particular, research for an engine has been conducted to achieve weight reduction and to enhance fuel consumption by downsizing and research for an automatic transmission has been conducted to simultaneously provide improved drivability and fuel consumption by achieving more shift-stages.

However, for the automatic transmission, as the number of shift stages increases, the number of internal parts, particularly, the number of planetary gear sets also increases and a full length of the transmission is thus increased, thereby causing mountability, production cost, weight, power transfer efficiency, etc., to be deteriorated. Therefore, it may be important for the automatic transmission to develop a planetary gear train capable of generating maximum efficiency using a minimal number of parts to increase a fuel consumption improvement effect through the achievement of the more shift-stages.

In terms of this, recently, the automatic transmission has been configured to implement a shift of 8-speed or more and has been installed within the vehicle, and research and development for a planetary gear train capable of implementing shift-stages of 8-speed shift-stages or more have been actively demanded. However, a general automatic transmission of 8-speed or more generally includes 3 to 4 planetary gear sets and 5 to 6 control elements (friction elements), and in this case, since the full length of the transmission is increased, there is a disadvantage that mountability is deteriorated.

Therefore, to achieve the more shift-stages of the automatic transmission, recently, a double row structure in which the planetary gear set is disposed on the planetary gear set has been adopted, or a dog clutch has been applied instead of a wet control element. However, an applicable structure is limited and deterioration of shift sense is accompanied due to the application of the dog clutch.

The above information disclosed in this section is merely for enhancement of understanding of the background of the invention and therefore it may contain information that does not form the prior art that is already known in this country to a person of ordinary skill in the art.

SUMMARY

The present invention provides a planetary gear train of an automatic transmission for a vehicle capable of obtaining power delivery performance improvement and fuel consumption improving effect through achievement of more shift-stages by implementing at least advance 11-speed shift-stages or more and at least a reverse 1-speed shift-stage or more using a minimal number of components and capable of improving driving noise using a driving point in a low revolution per minute (RPM) region of an engine.

An exemplary embodiment of the present invention provides a planetary gear train of an automatic transmission for a vehicle that may include: an input shaft configured to receive power of an engine; an output shaft configured to output the power; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft connecting the first rotation element and the tenth rotation element to each other and directly connected to the input shaft; a second shaft connected to the second rotation element; a third shaft connected to the third rotation element; a fourth shaft connected to the fourth rotation element and directly connected to a transmission housing; a fifth shaft that connects the fifth rotation element, the ninth rotation element, and the twelfth rotation element to each other and directly connected to the output shaft; a sixth shaft connected to the sixth rotation element and selectively connected to the second shaft; a seventh shaft connected to the seventh rotation element and selectively connected to the second shaft and the third shaft, respectively; an eighth shaft connected to the eighth rotation element and selectively connected to the first shaft and the third shaft, respectively; and a ninth shaft connected to the eleventh rotation element and selectively connected to the eighth shaft.

The second shaft may be selectively connected to the transmission housing. The first, second, and third rotation elements of the first planetary gear set may be a first sun gear, a first planetary carrier, and a first ring gear, respectively, the fourth, fifth, and sixth rotation elements of the second planetary gear set may be a second sun gear, a second planetary carrier, and a second ring gear, respectively, the seventh, eighth, and ninth rotation elements of the third planetary gear set may be a third sun gear, a third planetary carrier, and a third ring gear, respectively, and the tenth, eleventh, and twelfth rotation elements of the fourth planetary gear set may be a fourth sun gear, a fourth planetary carrier, and a fourth ring gear, respectively.

The planetary gear train may further include: a first clutch that selectively connects the first shaft and the eighth shaft to each other; a second clutch that selectively connects the second shaft and the sixth shaft to each other; a third clutch that selectively connects the second shaft and the seventh shaft to each other; a fourth clutch that selectively connects the third shaft and the seventh shaft to each other; a fifth clutch that selectively connects the third shaft and the eighth shaft to each other; a sixth clutch that selectively connects the eighth shaft and the ninth shaft to each other; and a first brake that selectively connects the second shaft and the transmission housing to each other.

BRIEF DESCRIPTION OF THE DRAWINGS

The above and other objects, features and other advantages of the present invention will be more clearly understood from the following detailed description when taken in conjunction with the accompanying drawings, in which:

FIG. 2 is an operation table for each shift stage of a control element which is used for the planetary gear train according to an exemplary embodiment of the present invention.

DETAILED DESCRIPTION

Figure 1:
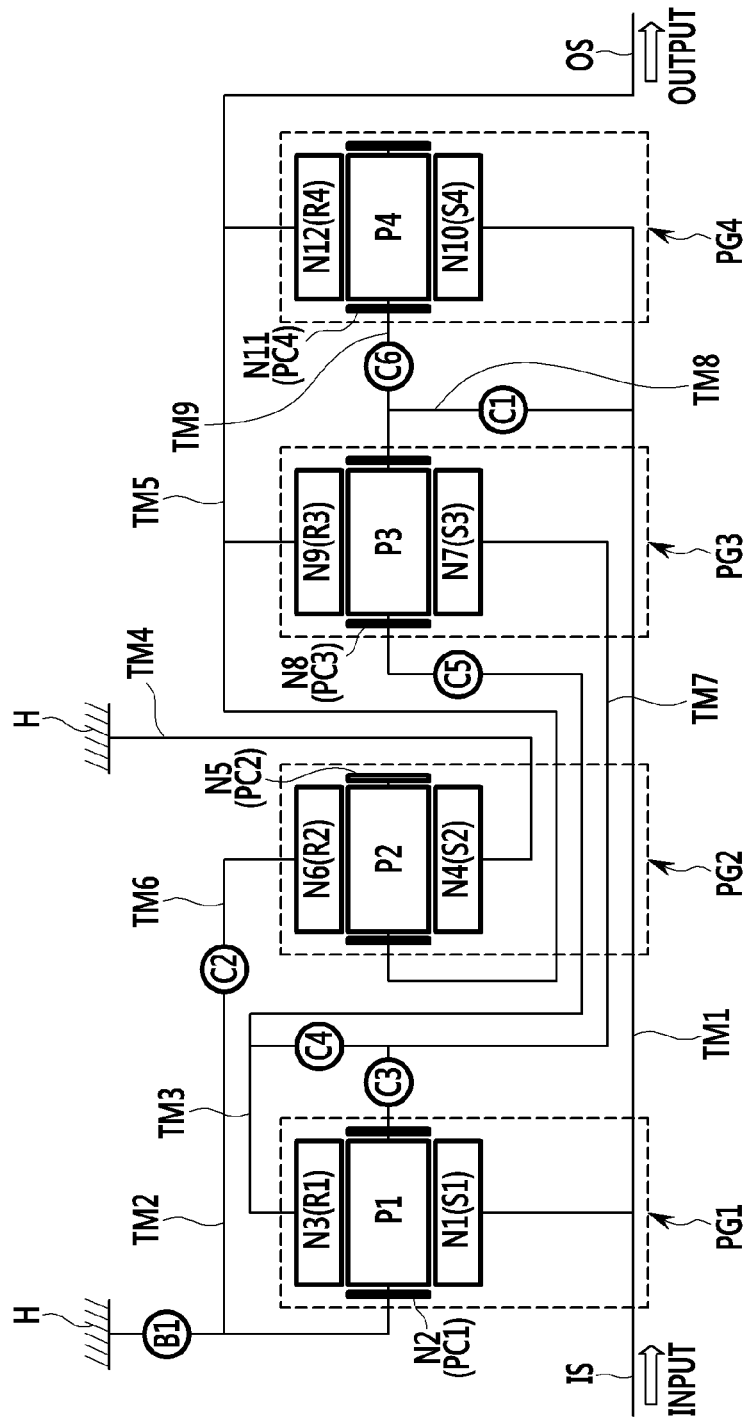
FIG. 1 is a configuration diagram of a planetary gear train according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

FIG. 1 is a configuration diagram of a planetary gear train according to an exemplary embodiment of the present invention. Referring to FIG. 1, the planetary gear train according to an exemplary embodiment of the present invention may include first, second, third, and fourth planetary gear sets PG1, PG2, PG3, and PG4 disposed on the same axis, an input shaft IS, an output shaft OS, nine shafts TM1 to TM9 that connect the respective rotation elements of the first, second, third, and fourth planetary gear sets PG1, PG2, PG3, and PG4 to each other, four clutches C1 to C4, and three brakes B1 to B3, which are control elements, and a transmission housing H.

In addition, rotation power from an engine input from the input shaft IS may be shifted by a mutual complementing operation between the first, second, third, and fourth planetary gear sets PG1, PG2, PG3, and PG4 and then may be output through the output shaft OS. Particularly, the respective planetary gear sets may be disposed in a sequence of the first, second, third, and fourth planetary gear sets PG1, PG2, PG3, and PG4 from an engine side. The input shaft IS may be an input member, and rotation power from a crack shaft of the engine may be input to the input shaft after a torque thereof is converted using a torque converter. The output shaft OS, which may be an output member, may be disposed on the same axis as an axis on which the input shaft IS is disposed and may be configured to transfer shifted driving force to a driving shaft through a differential apparatus.

The first planetary gear set PG1, which is a single pinion planetary gear set, may include a first sun gear S1, which is a first rotation element N1, a first planetary carrier PC1, which is a second rotation element N2, configured to rotationally support a first pinion gear P1 externally engaged with the first sun gear S1, which is the first rotation element N1, and a first ring gear R1, which is a third rotation element N3, internally engaged with the first pinion gear P1. The second planetary gear set PG2, which is the single pinion planetary gear set, may include a second sun gear S2 which is a fourth rotation element N4, a second planetary carrier PC2 which is a fifth rotation element N5 configured to rotationally support a second pinion gear P2 externally engaged with the second sun gear S2 which is the fourth rotation element N4, and a second ring gear R2 which is a sixth rotation element N6 internally engaged with the second pinion gear P2.

The third planetary gear set PG3, which is a single pinion planetary gear set, may include a third sun gear S3, which is a seventh rotation element N7, a third planetary carrier PC3, which is an eighth rotation element N8, configured to rotationally support a third pinion gear P3 externally engaged with the third sun gear S3, which is the seventh rotation element N7, and a third ring gear R3, which is a ninth rotation element N9, internally engaged with the third pinion gear P3. The fourth planetary gear set PG4, which is a single pinion planetary gear set, may include a fourth sun gear S4, which is a tenth rotation element N10, a fourth planetary carrier PC4, which is an eleventh rotation element N11, configured to rotationally support a fourth pinion gear P4 externally engaged with the fourth sun gear S4, which is the tenth rotation element N10, and a fourth ring gear R4, which is a twelfth rotation element N12, internally engaged with the fourth pinion gear P4.

Particularly, the first, second, third, and fourth planetary gear sets PG1, PG2, PG3, and PG4 described above including a total of nine shafts TM1 to TM9 may be operated while the first rotation element N1 is directly connected to the tenth rotation element N10, and the fifth rotation element N5 is directly connected to the ninth rotation element N9 and the twelfth rotation element N12. Configurations of the nine shafts TM1 to TM9 will be described in detail below.

Further, the eight shafts TM1 to TM8 may be rotation members configured to transfer power while being rotated together with the rotation elements connected to directly connect or selectively connect a plurality of rotation elements, among the rotation elements of the planetary gear sets PG1, PG2, PG3, and PG4, and may be fixed members directly connecting the rotation element to the transmission housing H to fix the rotation element to the transmission housing H.

The first shaft TM1 may connect the first rotation element N1 (e.g., the first sun gear S1) and the tenth rotation element N10 (e.g., the fourth sun gear S4), and may be directly connected to the input shaft IS to be operated as an input element. The second shaft TM2 may be connected to the second rotation element N2 (e.g., the first planetary carrier PC1), and may be selectively connected to the transmission housing H to be operated as a selective fixed element. The third shaft TM3 may be connected to the third rotation element N3 (e.g., the first ring gear R1). The fourth shaft TM4 may be connected to the fourth rotation element N4

(e.g., the second sun gear S2), and may be directly connected to the transmission housing H to be operated as a fixed element.

The fifth shaft TM5 may connect the fifth rotation element N5 (e.g., the second planetary carrier PC2), and the ninth rotation element N9 (e.g., the third ring gear R3) and the twelfth rotation element N12 (e.g., the fourth ring gear R4), and may be directly connected to the output shaft OS to be operated as an output element. The sixth shaft TM6 may be connected to the sixth rotation element N6 (e.g., the second ring gear R2), and may be selectively connected to the second shaft TM2. The seventh shaft TM7 may be connected to the seventh rotation element N7 (e.g., the third sun gear S3), and may be selectively connected to the second shaft TM2 and the third shaft TM3, respectively. The eighth shaft TM8 may be connected to the eighth rotation element N8 (e.g., the third planetary carrier PC3), and may be selectively connected to the first shaft TM1 and the third shaft TM3, respectively. The ninth shaft TM9 may be connected to the eleventh rotation element N11 (e.g., the fourth planetary carrier PC4), and may be selectively connected to the eighth shaft TM8.

In addition, six clutches C1 to C6 may be disposed at portions of shafts including the input shaft IS and the output shaft OS selectively connected to each other, among the nine shafts TM1 to TM9. One brake B1 may be disposed at a portion of a shaft selectively connected to the transmission housing H, among the nine shafts TM1 to TM9. In other words, disposed positions of the six clutches C1 to C6, and one brake B1 will be described below.

A first clutch C1 may be disposed between the first shaft TM1 and the eighth shaft TM8 to selectively connect the first shaft TM1 and the eighth shaft TM8 to transfer power. A second clutch C2 may be disposed between the second shaft TM2 and the sixth shaft TM6 to selectively connect the second shaft TM2 and the sixth shaft TM6 to transfer power. A third clutch C3 may be disposed between the second shaft TM2 and the seventh shaft TM7 to selectively connect the second shaft TM2 and the seventh shaft TM7 to transfer power. A fourth clutch C4 may be disposed between the third shaft TM3 and the seventh shaft TM7 to selectively connect the third shaft TM3 and the seventh shaft TM7 to transfer power. A fifth clutch C5 may be disposed between the third shaft TM3 and the eighth shaft TM8 to selectively connect the third shaft TM3 and the eighth shaft TM8 to transfer power. A sixth clutch C6 may be disposed between the eighth shaft TM8 and the ninth shaft TM9 to selectively connect the eighth shaft TM8 and the ninth shaft TM9 to transfer power.

A first brake B1 may be disposed between the second shaft TM2 and the transmission housing H to selectively connect the second shaft TM2 to the transmission housing H to be fixed thereto. The respective control elements including the first, second, third, fourth, fifth, and sixth clutches C1, C2, C3, C4, C5, and C6, and the first brake B1 may be formed of a multi-plate type hydraulic friction coupling unit which is frictionally coupled by hydraulic pressure.

FIG. 2 is an operation table for each shift stage of a control element used for the planetary gear train according to an exemplary embodiment of the present invention. Referring to FIG. 2, in each shift stage of the planetary gear train according to an exemplary embodiment of the present invention, while three control elements among the first, second, third, fourth, fifth, and sixth clutches C1 to C6, and the first brake B1, which are the control elements, are operated, shifts of reverse 1-speed and advance 11-speed may be performed. A shift operation will be described below.

In an advance 1-speed shift stage (D1), the third and fourth clutches C3 and C4 and the first brake B1 may be operated simultaneously. Therefore, when the second shaft TM2 is connected to the seventh shaft TM7 by an operation of the third clutch C3, and the third shaft TM3 is connected to the seventh shaft TM7 by an operation of the fourth clutch C4, rotation power of the input shaft IS may be input to the first shaft TM1. In addition, when the fourth shaft TM4 is operated as the fixed element, while the second shaft TM2 is operated as the fixed element by an operation of the first brake B1, a shift stage may be shifted to an advance 1-speed by a mutual compensating operation of the respective shafts, and thus, the rotation power may be output through the output shaft OS connected to the fifth shaft TM5.

In an advance 2-speed shift stage (D2), the third and sixth clutches C3 and C6 and the first brake B1 may be operated simultaneously. Therefore, when the second shaft TM2 is connected to the seventh shaft TM7 by an operation of the third clutch C3, and the eighth shaft TM8 is connected to the ninth shaft TM9 by an operation of the sixth clutch C6, rotation power of the input shaft IS may be input to the first shaft TM1. In addition, when the fourth shaft TM4 is operated as the fixed element, a shift stage may be shifted to an advance 2-speed by a mutual compensating operation of the respective shafts while the second shaft TM2 is operated as the fixed element by an operation of the first brake B1, and thus, the rotation power may be output through the output shaft OS connected to the fifth shaft TM5.

In an advance 3-speed shift stage (D3), the third, fourth, and sixth clutches C3, C4, and C6 may be operated simultaneously. Therefore, when the second shaft TM2 is connected to the seventh shaft TM7 by an operation of the third clutch C3, the third shaft TM3 is connected to the seventh shaft TM7 by an operation of the fourth clutch C4, and the eight shaft TM8 is connected to the ninth shaft TM9 by an operation of the sixth clutch C6, rotation power of the input shaft IS may be input to the first shaft TM1. In addition, the shift-stage may be shifted to an advance 3-speed by a mutual compensating operation of the respective shafts while the fourth shaft TM4 is operated as the fixed element, and thus, the rotation power may be output through the output shaft OS connected to the fifth shaft TM5.

In an advance 4-speed shift stage (D4), the second, third, and sixth clutches C2, C3, and C6 may be operated simultaneously. Therefore, when the second shaft TM2 is connected to the sixth shaft TM6 by an operation of the second clutch C2, the second shaft TM2 is connected to the seventh shaft TM7 by an operation of the third clutch C3, and the eighth shaft TM8 is connected to the ninth shaft TM9 by an operation of the sixth clutch C6, rotation power of the input shaft IS may be input to the first shaft TM1. In addition, the shift-stage may be shifted to an advance 4-speed by a mutual compensating operation of the respective shafts while the fourth shaft TM4 is operated as the fixed element, and thus, the rotation power may be output through the output shaft OS connected to the fifth shaft TM5.

In an advance 5-speed shift stage (D5), the third, fifth, and sixth clutches C3, C5, and C6 may be operated simultaneously. Therefore, when the second shaft TM2 is connected to the seventh shaft TM7 by an operation of the third clutch C3, the third shaft TM3 is connected to the eighth shaft TM8 by an operation of the fifth clutch C5, and the eighth shaft TM8 is connected to the ninth shaft TM9 by an operation of the sixth clutch C6, rotation power of the input shaft IS may be input to the first shaft TM1. In addition, the shift-stage may be shifted to an advance 5-speed by a mutual compensating operation of the respective shafts while the fourth shaft TM4 is operated as the fixed element, and thus, the rotation power may be output through the output shaft OS connected to the fifth shaft TM5.

In an advance 6-speed shift stage (D6), the first, third, and sixth clutches C1, C3, and C6 may be operated simultaneously. Therefore, when the first shaft TM1 is connected to the eighth shaft TM8 by an operation of the first clutch C1, the second shaft TM2 is connected to the seventh shaft TM7 by an operation of the third clutch C3, and the eight shaft TM8 is connected to the ninth shaft TM9 by an operation of the sixth clutch C6, rotation power of the input shaft IS may be input to the first shaft TM1. In addition, the shift-stage may be shifted to an advance 6-speed by a mutual compensating operation of the respective shafts while the fourth shaft TM4 is operated as the fixed element, and thus, the rotation power may be output through the output shaft OS connected to the fifth shaft TM5.

In an advance 7-speed shift stage (D7), the first, second, and third clutches C1, C2, and C3 may be operated simultaneously. Therefore, when the first shaft TM1 is connected to the eighth shaft TM8 by an operation of the first clutch C1, the second shaft TM2 is connected to the sixth shaft TM6 by an operation of the second clutch C2, and the second shaft TM2 is connected to the seventh shaft TM7 by an operation of the third clutch C3, rotation power of the input shaft IS may be input to the first shaft TM1. In addition, the shift-stage may be shifted to an advance 7-speed that outputs the input as it is by a mutual compensating operation of the respective shafts while the fourth shaft TM4 is operated as the fixed element, and thus, the rotation power may be output through the output shaft OS connected to the fifth shaft TM5.

In an advance 8-speed shift stage (D8), the first, second, and sixth clutches C1, C2, and C6 may be operated simultaneously. Therefore, when the first shaft TM1 is connected to the eighth shaft SM8 by an operation of the first clutch C1, the second shaft TM2 is connected to the sixth shaft TM6 by an operation of the second clutch C2, and the eighth shaft TM8 is connected to the ninth shaft TM9 by an operation of the sixth clutch C6, rotation power of the input shaft IS may be input to the first shaft TM1. In addition, the shift-stage may be shifted to an advance 8-speed of an overdrive state by a mutual compensating operation of the respective shafts while the fourth shaft TM4 is operated as the fixed element, and thus, the rotation power may be output through the output shaft OS connected to the fifth shaft TM5.

In an advance 9-speed shift stage (D9), the first and second clutches C1 and C2 and the first brake B1 may be operated simultaneously. Therefore, when the first shaft TM1 is connected to the eighth shaft SM8 by an operation of the first clutch C1, and the second shaft TM2 is connected to the sixth shaft TM6 by an operation of the second clutch C2, rotation power of the input shaft IS may be input to the first shaft TM1. In addition, when the fourth shaft TM4 is operated as the fixed element, the shift stage may be shifted to an advance 9-speed of an over drive state by a mutual compensating operation of the respective shafts, while the second shaft TM2 is operated as the fixed element by an operation of the first brake B1, and thus, the rotation power may be output through the output shaft OS connected to the fifth shaft TM5.

In an advance 10-speed shift stage (D10), the first and fourth clutches C1 and C4 and the first brake B1 may be operated simultaneously. Therefore, when the first shaft TM1 is connected to the eighth shaft SM8 by an operation of the first clutch C1, and the third shaft TM3 is connected to the seventh shaft TM7 by an operation of the fourth clutch C4, rotation power of the input shaft IS may be input to the first shaft TM1. In addition, when the fourth shaft TM4 is operated as the fixed element, the shift stage may be shifted to an advance 10-speed of an over drive state by a mutual compensating operation of the respective shafts, while the second shaft TM2 is operated as the fixed element by an operation of the first brake B1, and thus, the rotation power may be output through the output shaft OS connected to the fifth shaft TM5.

In an advance 11-speed shift stage (D11), the first and sixth clutches C1 and C6 and the first brake B1 may be operated simultaneously. Therefore, when the first shaft TM1 is connected to the eighth shaft SM8 by an operation of the first clutch C1, and the eighth shaft TM8 is connected to the ninth shaft TM9 by an operation of the sixth clutch C6, rotation power of the input shaft IS may be input to the first shaft TM1. In addition, when the fourth shaft TM4 is operated as the fixed element, the shift stage may be shifted to an advance 11-speed, which may be a highest shift stage, by a mutual compensating operation of the respective shafts, while the second shaft TM2 is operated as the fixed element by an operation of the first brake B1, and thus, the rotation power may be output through the output shaft OS connected to the fifth shaft TM5.

In a reverse shift-stage REV, the second and third clutches C2 and C3 and the first brake B1 may be operated simultaneously. Therefore, when the second shaft TM2 is connected to the sixth shaft SM6 by an operation of the second clutch C2, and the second shaft TM2 is connected to the seventh shaft TM7 by an operation of the third clutch C3, rotation power of the input shaft IS may be input to the first shaft TM1. In addition, when the fourth shaft TM4 is operated as the fixed element, the shift stage may be reversely shifted by a mutual compensating operation of the respective shafts, while the second shaft TM2 is operated as the fixed element by an operation of the first brake B1, and thus, the rotation power may be output in a reverse rotation through the output shaft OS connected to the fifth shaft TM5.

As described above, the planetary gear train according to an exemplary embodiment of the present invention may realize at least advance 11-speed shift-stages or more and at least a reverse 1-speed shift-stage or more through the four planetary gear sets PG1, PG2, PG3, and PG4 by adjusting the operations of the six clutches C1 to C6 and one brake B1.

Further, the planetary gear train according to an exemplary embodiment of the present invention may implement the shift-stage suitable for the revolution per minute of the engine by achieving the more shift-stage of the automatic transmission, and may particularly improve driving noise of the vehicle by using the driving point in the low revolution per minute region of the engine. In addition, the planetary gear train according to an exemplary embodiment of the present invention may maximize driving efficiency of the engine and improve power delivery performance and fuel consumption through the achievement of the more shift-stages of the automatic transmission.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A planetary gear train of an automatic transmission for a vehicle, comprising:
   an input shaft configured to receive power of an engine;

an output shaft configured to output the power;
a first planetary gear set that includes first, second, and third rotation elements;
a second planetary gear set that includes fourth, fifth, and sixth rotation elements;
a third planetary gear set that includes seventh, eighth, and ninth rotation elements;
a fourth planetary gear set that includes tenth, eleventh, and twelfth rotation elements;
a first shaft configured to connect the first rotation element and the tenth rotation element to each other and directly connected to the input shaft;
a second shaft connected to the second rotation element;
a third shaft connected to the third rotation element;
a fourth shaft connected to the fourth rotation element and directly connected to a transmission housing;
a fifth shaft configured to connect the fifth rotation element, the ninth rotation element, and the twelfth rotation element to each other and directly connected to the output shaft;
a sixth shaft connected to the sixth rotation element and selectively connected to the second shaft;
a seventh shaft connected to the seventh rotation element and selectively connected to the second shaft and the third shaft, respectively;
an eighth shaft connected to the eighth rotation element and selectively connected to the first shaft and the third shaft, respectively; and
a ninth shaft connected to the eleventh rotation element and selectively connected to the eighth shaft.

2. The planetary gear train of claim 1, wherein the second shaft is selectively connected to the transmission housing.

3. The planetary gear train of claim 2, further comprising:
a first clutch configured to selectively connect the first shaft and the eighth shaft to each other;
a second clutch configured to selectively connect the second shaft and the sixth shaft to each other;
a third clutch configured to selectively connect the second shaft and the seventh shaft to each other;
a fourth clutch configured to selectively connect the third shaft and the seventh shaft to each other;
a fifth clutch configured to selectively connect the third shaft and the eighth shaft to each other;
a sixth clutch configured to selectively connect the eighth shaft and the ninth shaft to each other; and
a first brake configured to selectively connect the second shaft and the transmission housing to each other.

4. The planetary gear train of claim 1, wherein:
the first, second, and third rotation elements of the first planetary gear set are a first sun gear, a first planetary carrier, and a first ring gear, respectively,
the fourth, fifth, and sixth rotation elements of the second planetary gear set are a second sun gear, a second planetary carrier, and a second ring gear, respectively,
the seventh, eighth, and ninth rotation elements of the third planetary gear set are a third sun gear, a third planetary carrier, and a third ring gear, respectively, and
the tenth, eleventh, and twelfth rotation elements of the fourth planetary gear set are a fourth sun gear, a fourth planetary carrier, and a fourth ring gear, respectively.

5. A planetary gear train of an automatic transmission for a vehicle, comprising:
an input shaft configured to receive power of an engine;
an output shaft configured to output the power;
a first planetary gear set that includes first, second, and third rotation elements;
a second planetary gear set that includes fourth, fifth, and sixth rotation elements;
a third planetary gear set that includes seventh, eighth, and ninth rotational elements; and
a fourth planetary gear set that includes tenth, eleventh, and twelfth rotational elements,
wherein the input shaft is directly connected to the first rotation element,
the output shaft is directly connected to the twelfth rotation element,
the first rotation element is directly connected to the tenth rotation element,
the second rotation element is selectively connected to the sixth rotation element and the seventh rotation element, respectively,
the third rotation element is selectively connected to the seventh rotation element and the eighth rotation element, respectively,
the fourth rotational element is directly connected to a transmission housing,
the fifth rotation element is directly connected to the ninth rotation element and the twelfth rotation element to thereby be directly connected to the output shaft,
the eighth rotation element is selectively connected to the first rotation element, and
the eleventh rotation element is selectively connected to the eighth rotational element.

6. The planetary gear train of claim 5, wherein the second rotation element is selectively connected to the transmission housing.

7. The planetary gear train of claim 6, further comprising:
a first clutch configured to selectively connect the first rotation element and the eighth rotation element to each other;
a second clutch configured to selectively connect the second rotation element and the sixth rotation element to each other;
a third clutch configured to selectively connect the second rotation element and the seventh rotation element to each other;
a fourth clutch configured to selectively connect the third rotation element and the seventh rotation element to each other;
a fifth clutch configured to selectively connect the third rotation element and the eighth rotation element to each other;
a sixth clutch configured to selectively connect the eighth rotation element and the eleventh rotation element to each other; and
a first brake configured to selectively connect the second rotation element and the transmission housing to each other.

8. The planetary gear train of claim 5, wherein:
the first, second, and third rotation elements of the first planetary gear set are a first sun gear, a first planetary carrier, and a first ring gear, respectively,
the fourth, fifth, and sixth rotation elements of the second planetary gear set are a second sun gear, a second planetary carrier, and a second ring gear, respectively,
the seventh, eighth, and ninth rotation elements of the third planetary gear set are a third sun gear, a third planetary carrier, and a third ring gear, respectively, and
the tenth, eleventh, and twelfth rotation elements of the fourth planetary gear set are a fourth sun gear, a fourth planetary carrier, and a fourth ring gear, respectively.

* * * * *